(12) United States Patent
Daggubati

(10) Patent No.: US 12,457,303 B2
(45) Date of Patent: Oct. 28, 2025

(54) SYSTEM FOR NOTIFYING A FIRST USER REGARDING AN ACTIVITY OF A SECOND USER

(71) Applicant: Kishore Daggubati, Danville, CA (US)

(72) Inventor: Kishore Daggubati, Danville, CA (US)

(*) Notice: Subject to any disclaimer, the term of this patent is extended or adjusted under 35 U.S.C. 154(b) by 274 days.

(21) Appl. No.: 18/303,593

(22) Filed: Apr. 20, 2023

(65) Prior Publication Data
US 2023/0252377 A1   Aug. 10, 2023

Related U.S. Application Data

(63) Continuation-in-part of application No. 17/577,043, filed on Jan. 17, 2022, now Pat. No. 11,765,319.

(51) Int. Cl.
| | |
|---|---|
| *H04N 7/15* | (2006.01) |
| *H04L 65/1069* | (2022.01) |
| *H04L 65/1093* | (2022.01) |
| *H04L 65/403* | (2022.01) |
| *G06Q 10/0631* | (2023.01) |

(52) U.S. Cl.
CPC ........... *H04N 7/15* (2013.01); *H04L 65/1069* (2013.01); *H04L 65/1093* (2013.01); *H04L 65/403* (2013.01); *H04N 7/152* (2013.01); *G06Q 10/063116* (2013.01)

(58) Field of Classification Search
None
See application file for complete search history.

(56) References Cited

U.S. PATENT DOCUMENTS

| | | | |
|---|---|---|---|
| 11,562,657 B1* | 1/2023 | Fieldman | G09B 5/14 |
| 11,765,319 B2* | 9/2023 | Daggubati | H04L 65/403 |
| | | | 348/14.07 |
| 2016/0234264 A1* | 8/2016 | Coffman | H04L 65/4015 |
| 2017/0171120 A1* | 6/2017 | Chiang | H04L 51/043 |
| 2022/0067666 A1* | 3/2022 | Shiner | G06Q 10/103 |
| 2022/0353098 A1* | 11/2022 | Han | H04L 12/1818 |
| 2022/0353468 A1* | 11/2022 | Walia | H04N 7/147 |
| 2023/0282370 A1* | 9/2023 | Weinberg | G16H 40/67 |
| | | | 705/2 |

* cited by examiner

Primary Examiner — Quoc D Tran

(57) ABSTRACT

A system for notifying a first user regarding an activity of a second user comprises of a first data processing system associated with a first user, a second data processing system associated with a second user, and a server. The server comprises one or more processors configured to create a virtual room and a virtual lounge associated with the first user, establish a secured connection between the first data processing system and the second data processing system, provide the second user, access to the virtual lounge of the virtual room. The server is configured to allow the second user to schedule an online meeting with the first user or allow the second user to create a message for the first user when the status of the first user is other than available, and notify the first user of the scheduled online meeting or the created message.

19 Claims, 14 Drawing Sheets

SYSTEM FOR NOTIFYING A FIRST USER REGARDING AN ACTIVITY OF A SECOND USER

FIELD OF THE INVENTION

This application relates generally to the field of video conferencing. More particularly, the system relates to notifying a first user regarding an activity initiated by a second user.

BRIEF STATEMENT OF THE PRIOR ART

In this modern world, time saving is considered to be the topmost priority for everyone. In this digital age, it has become much easier for anyone to connect and speak with the other person, and as such the need to schedule meetings without the need for continual conversations has also increased.

However, the current video conference scheduling tools that are available fail to achieve scheduling of video conferences with minimal human intervention. Further, tools to send a message are overly complicated, which discourages the user from choosing to send a message. Current state of the art tools increases the input required from users in order to schedule meeting or to send a message across. Furthermore, none of the video calling tools available in the current market offer users the flexibility of rescheduling a meeting or communicating with another participant of the meeting via message.

Therefore, there is a need for a video conferencing system that is easy to navigate and further eliminates the need for a second user to continually communicate with a first user in order to schedule a meeting or communicate information.

SUMMARY OF THE INVENTION

In an embodiment, a system for notifying a first user regarding an activity of a second user is disclosed. The system comprises a first data processing system associated with a first user, a second data processing system associated with a second user, and a server. The server comprises at least one processor configured to create a virtual room and a virtual lounge associated with the virtual room, wherein the virtual room is uniquely associated with the first user. The server is configured to establish a secured connection between the first data processing system and the second data processing system and provide the second user, access to the virtual lounge of the virtual room upon establishing the secured connection between the first data processing system and the second data processing system. The server is also configured to notify status of the first user to the second user when the second user is in the virtual lounge, wherein when the status of the first user is other than available, the server is configured to allow the second user to schedule an online meeting with the first user, communicate availability of the first user to the second user for scheduling the online meeting, and notify the first user of the scheduled online meeting.

In another embodiment, a server is configured to notify status of the first user to the second user when the second user is in the virtual lounge, wherein when the status of the first user is other than available, the server is configured to allow the second user to create a message and notify the first user regarding the creation of the message.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
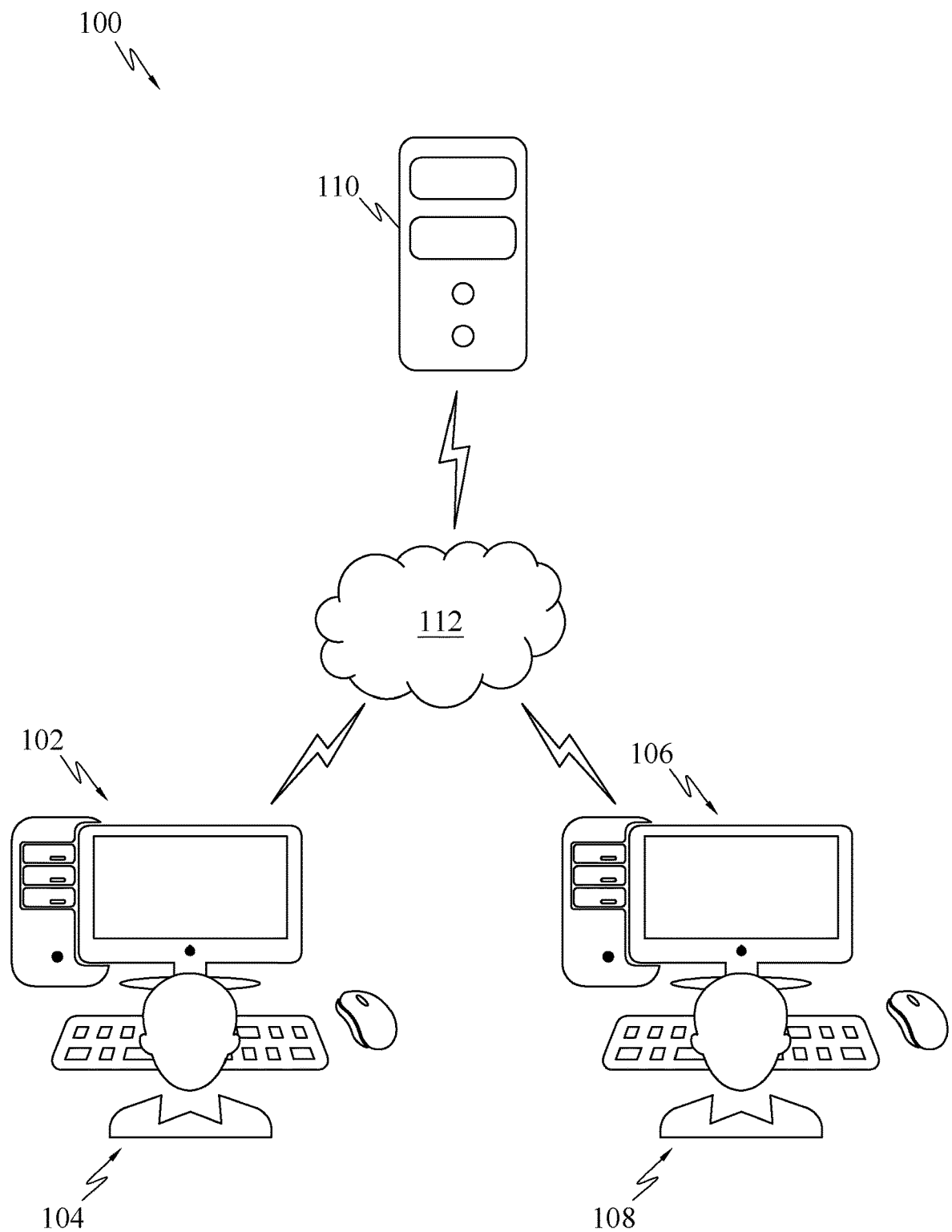
FIG. 1 illustrates a system 100 for notifying a first user 104 regarding an activity of a second user 108, in accordance with an embodiment.

FIG. 1 illustrates a system 100 for notifying a first user 104 regarding an activity of a second user 108, in accordance with an embodiment. The system 100 may comprise a first data processing system 102, a second data processing system 106, a server 110, and a network 112. The first data processing system 102 may be associated with the first user 104. The second data processing system 106 may be associated with the second user 108. The server 110 may be configured to coordinate a secured connection between the first data processing system 102 and the second data processing system 106. The first data processing system 102, the second data processing system 106, and the server 110 may further be connected via the network 112, wherein the network 112 enables communication between them. The network 112 may be, but not limited to, a local area network, wide area network or a metropolitan area network.

In another embodiment, the system 100 may comprise a third data processing system, a fourth data processing system, and so on, wherein the third data processing system may be associated with a third user, the fourth data processing system may be associated with a fourth user, and so on.

Figure 2:
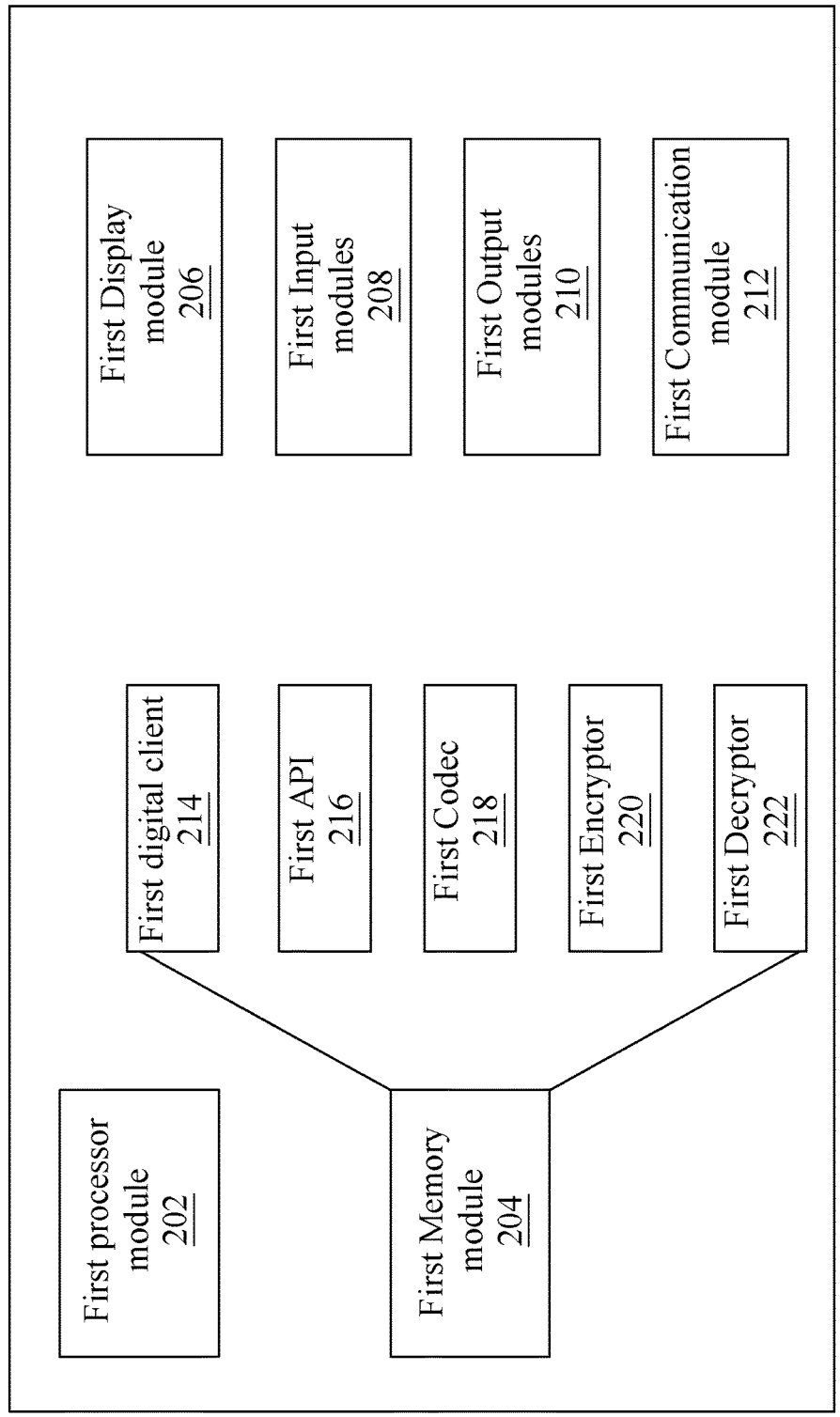
FIG. 2 is a block diagram illustrating a first data processing system 102, in accordance with an embodiment.

FIG. 2 is a block diagram illustrating the first data processing system 102, in accordance with an embodiment. The first data processing system 102 may comprise a first processor module 202, a first memory module 204, a first display module 206, first input modules 208, first output modules 210 and a first communication module 212.

The first processor module 202 may be implemented in the form of one or more processors and may be implemented as appropriate in hardware, computer-executable instructions, firmware, or combinations thereof. Computer-executable instruction or firmware implementations of the first processor module 202 may include computer-executable or machine-executable instructions written in any suitable programming language to perform the various functions described.

The first memory module 204 may include a permanent memory such as hard disk drive, may be configured to store data, and executable program instructions that are implemented by the processor module. The first memory module 204 may be implemented in the form of a primary and a secondary memory. The first memory module 204 may store additional data and program instructions that are loadable and executable on the first processor module 202, as well as data generated during the execution of these programs. Further, the first memory module 204 may be a volatile memory, such as random-access memory and/or a disk drive, or a non-volatile memory. The first memory module 204 may comprise of removable memory such as a Compact Flash card, Memory Stick, Smart Media, Multimedia Card, Secure Digital memory, or any other memory storage that exists currently or may exist in the future.

In an embodiment, the first memory module 204 may further comprise a first digital client 214, a first Application Programming Interface (API) 216, a first codec 218, a first encryptor 220 and a first decryptor 222. The first digital client 214 may be a web browser or a software application enables video conferencing, wherein the first digital client 214 may further comprise a first digital client display interface. The first digital client display interface may enable the interaction of the first user 104 with the first data processing system 102. The first codec 218 may include computer-executable or machine-executable instructions written in any suitable programming language to compress outgoing data and decompress incoming data. The first encryptor 220 may encrypt the data being sent and first decryptor 222 may decrypt the incoming data.

The first display module 206 may display an image, a video, or data to a user. For example, the first display module 206 may include a panel, and the panel may be an LCD, LED or an AM-OLED.

The first input modules 208 may provide an interface for input devices such as keypad, touch screen, mouse and stylus among other input devices. In an embodiment, the first first input module 208 includes a camera and a microphone.

The first output modules 210 may provide an interface for output devices such as display screen, speakers, printer and haptic feedback devices, among other output devices.

The first communication module 212 may be used by the first data processing system 102 to communicate with the server 110. The first communication module 212, as an example, may be a GPRS module, or other modules that enable wireless communication.

Figure 3:
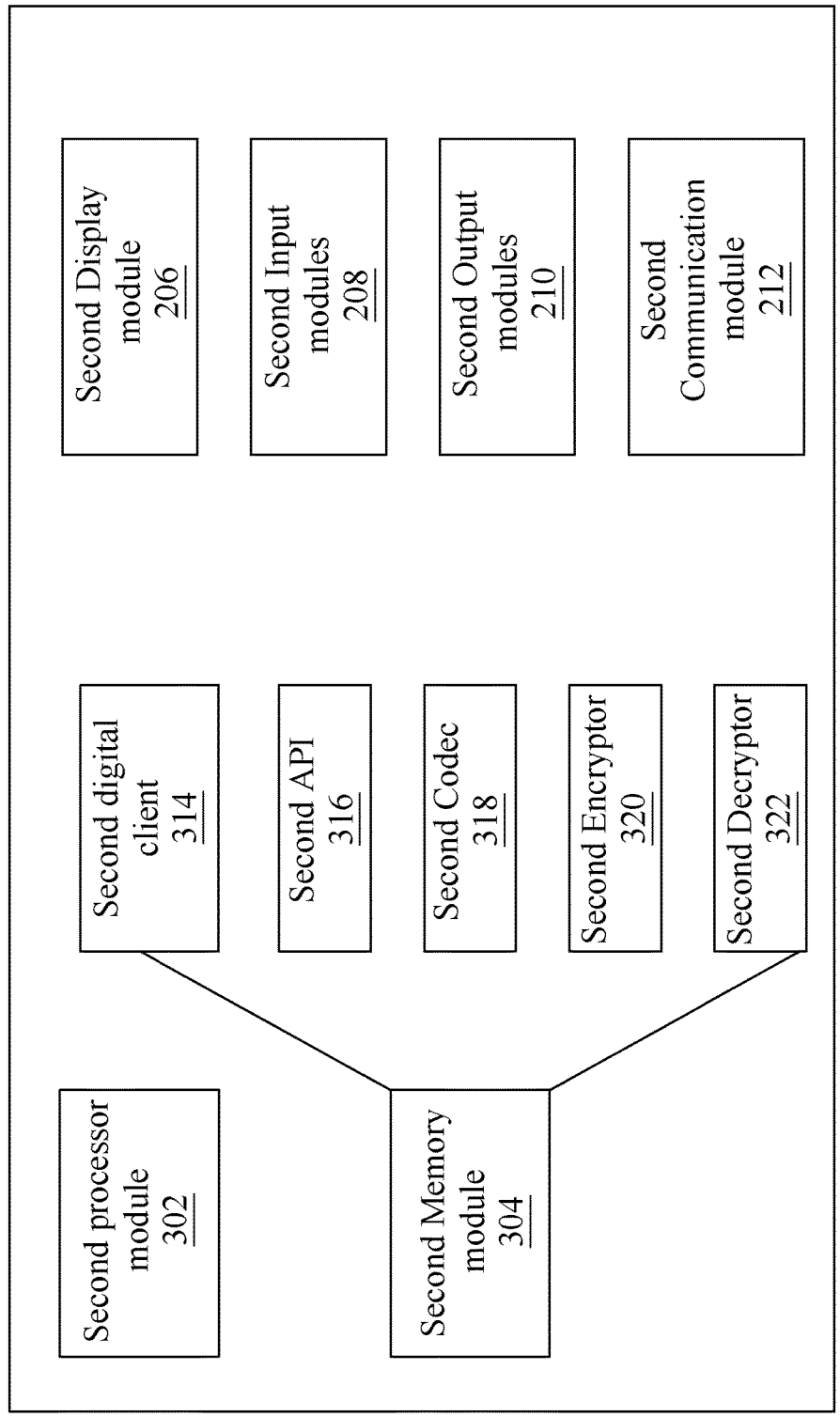
FIG. 3 is a block diagram illustrating a second data processing system 106, in accordance with an embodiment.

FIG. 3 is a block diagram illustrating a second data processing system 106, in accordance with an embodiment. The second data processing system 106 may comprise a second processor module 302, a second memory module 304, a second display module 306, second input modules 308, second output modules 310 and a second communication module 312.

It may be noted that the second data processing system 106, may have a similar architecture as that of the first data processing system 102, and is therefore not described in detail for the sake of brevity.

In an embodiment, the third data processing system, the fourth data processing system, and so on, may have a similar architecture as that of the first data processing system 102.

Figure 4:
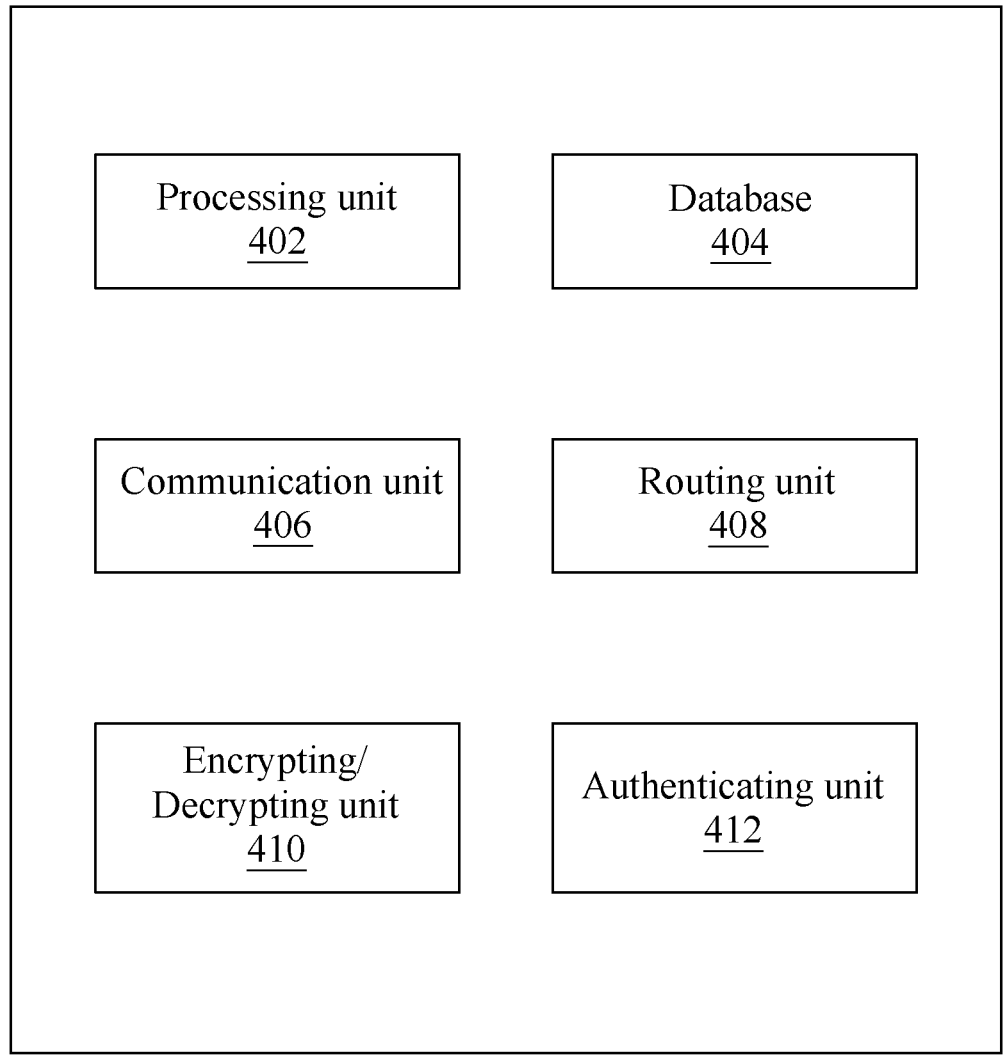
FIG. 4 is a block diagram illustrating architecture of a server 110, in accordance with an embodiment.
Figure 5:
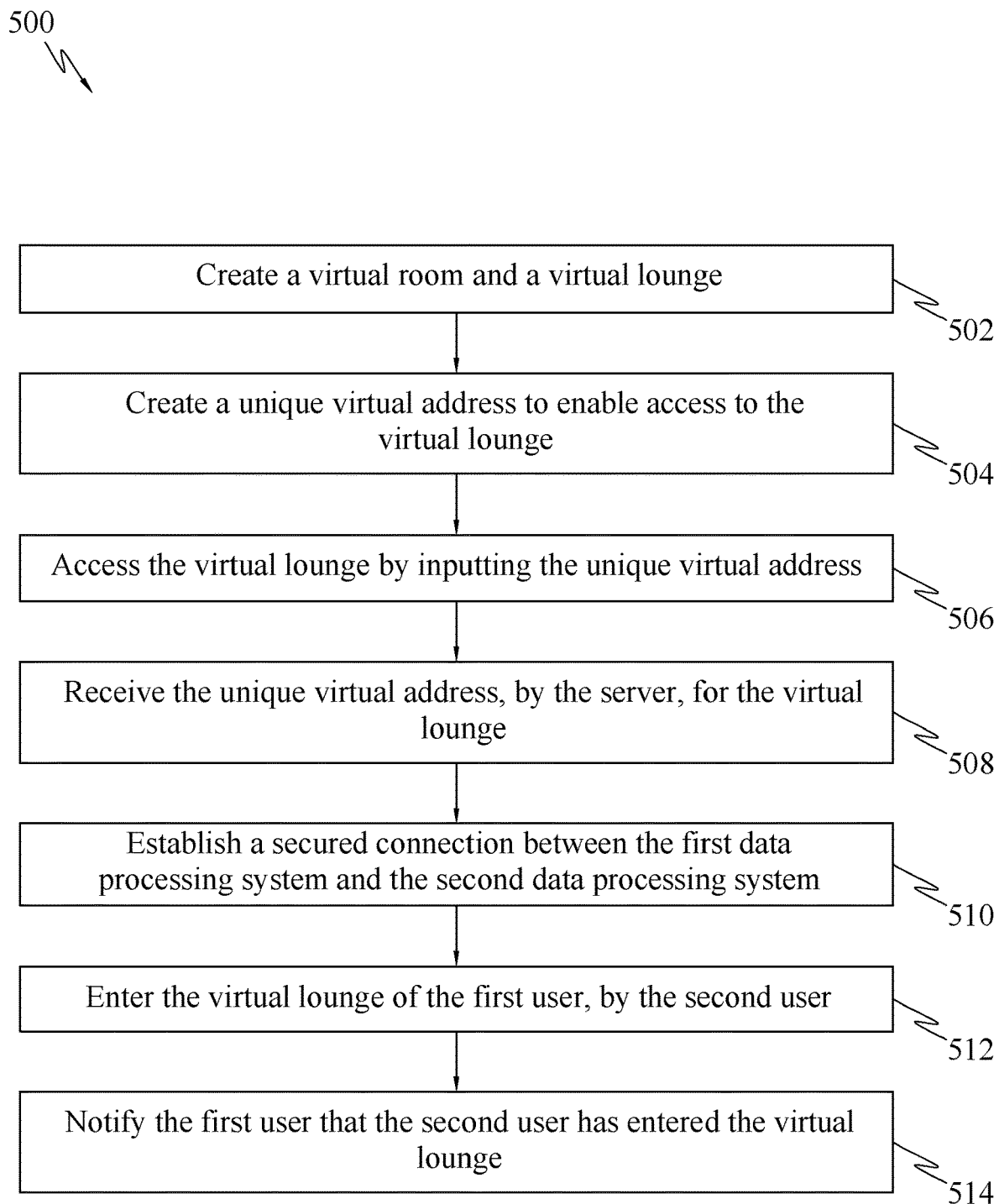
FIG. 5 is a flowchart 500 illustrating establishing of a connection between the first data processing system 102 and the second data processing system 106, in accordance with an embodiment.

FIG. 4 is a block diagram illustrating the architecture of a server 110, in accordance with an embodiment. The server 110 may comprise a processing unit 402, a database 404, a communication unit 406, a routing unit 408, an encrypting/decrypting unit 410 and an authenticating unit 412.

The processing unit 402 may be implemented in the form of one or more processors and may be implemented as appropriate in hardware, computer-executable instructions, firmware, or combinations thereof. Computer-executable instruction or firmware implementations of the processing unit 402 may include computer-executable or machine-executable instructions written in any suitable programming language to perform the various functions described.

The database 404 may include a permanent memory such as hard disk drive, that may be configured to store data, and executable program instructions that are implemented by the processor module.

In one embodiment, the database 404 may be configured to store information related to the first user 104, the second user 108, the third user, and so on, which may not be limited to email ID, phone number of the users, information pertaining to the first data processing system 102, the second data processing system 106, third data processing system and so on.

The communication unit 406 may be used by the server 110 to communicate with the first data processing system 102 and the second data processing system 106. The communication unit 406, as an example, may be a GPRS module, or other modules that enable wireless communication.

In an embodiment, the communication unit 406 may be used by the server 110 to communicate with the first data processing system 102 and the second data processing system 106, third data processing system, fourth data processing system, and so on.

The routing unit 408 may be configured to enable identification of data processing systems to which the data must be transmitted.

The encrypting/decrypting unit 410 may be configured to encrypt/decrypt the incoming data from each of the data processing systems and encrypt/decrypt the outgoing data from the server 114.

The authenticating unit 412 may be configured to authenticate each of the users associated with each of the data processing systems before establishing a connection.

Referring to FIGS. 5, 6A-6B, and 7, at step 502, the server 110 may receive an instruction from the first user 104, wherein upon receiving the instruction, the server 110 may create a virtual room 702 and a virtual lounge 602 associated with the virtual room 702 for the first user 104.

At step 504, the server 110 may be configured to create a unique virtual address which provides access to the virtual lounge 602.

At step 506, the second user 108 may input the unique virtual address of the virtual room 702 of the first user 104 using the second input module 308 that is associated with the second data processing system 106 for accessing the virtual lounge 602 of the virtual room 702.

At step 508, the server 110 may be configured to receive the unique virtual address from the second user 108 to access the virtual lounge 602 of the virtual room 702.

At step 510, the server 110 may be configured to establish a secured connection between the first data processing system 102 and the second data processing system 106, when the second user 108 accesses the virtual lounge 602 using the unique virtual address.

At step 512, the second user 108 is provided access to the virtual lounge 602 and thereby enters the virtual lounge 602 of the virtual room 702 of the first user 104.

At step 514, the server 110 may be configured to notify the first user 104 that the second user 108 has entered the virtual lounge 602 of the virtual room 702.

Figure 6A:
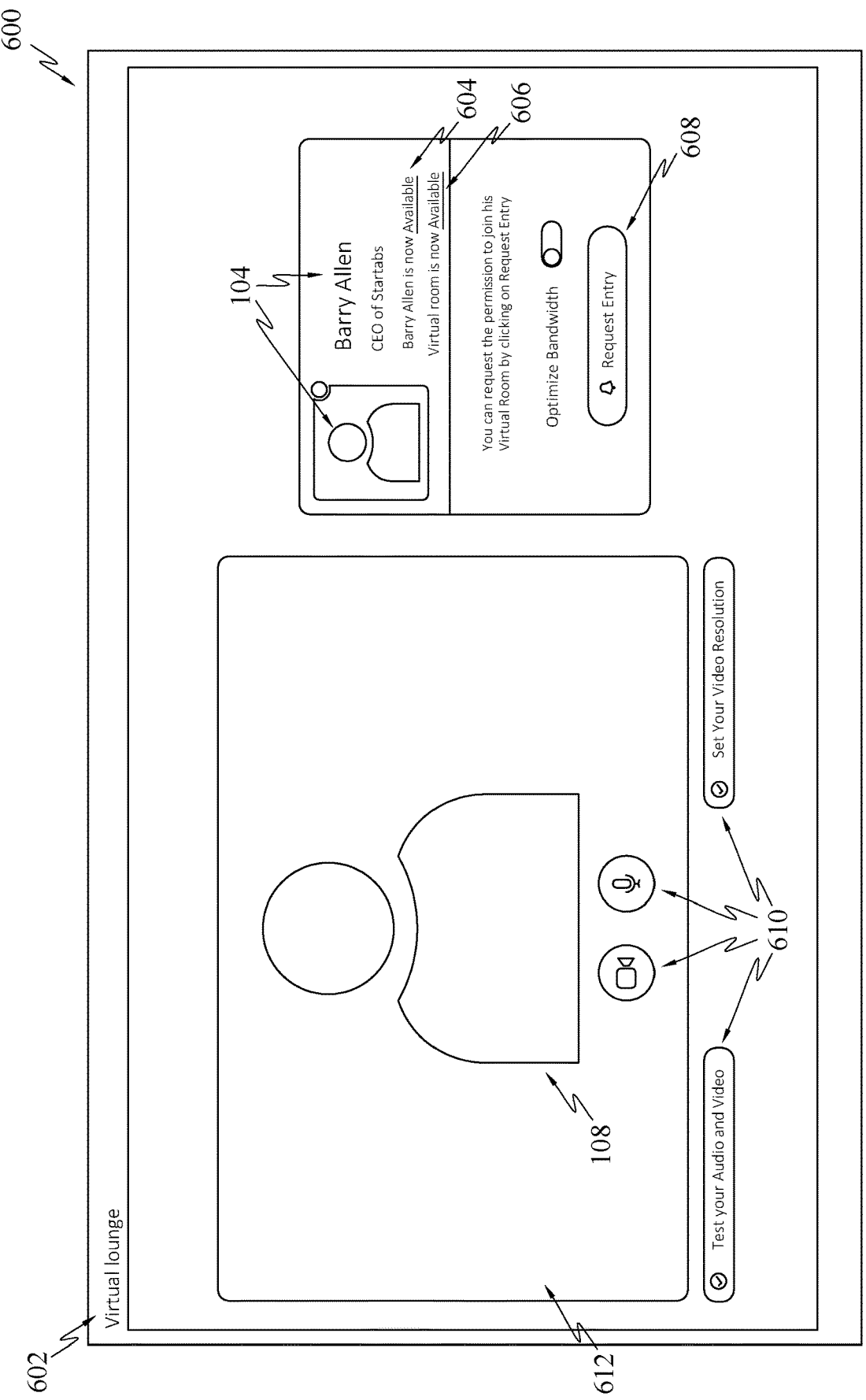
FIGS. 6A and 6B illustrate a user interface 600 displayed to the second user 108 on the second data processing system 106, in accordance with an embodiment.
Figure 6B:
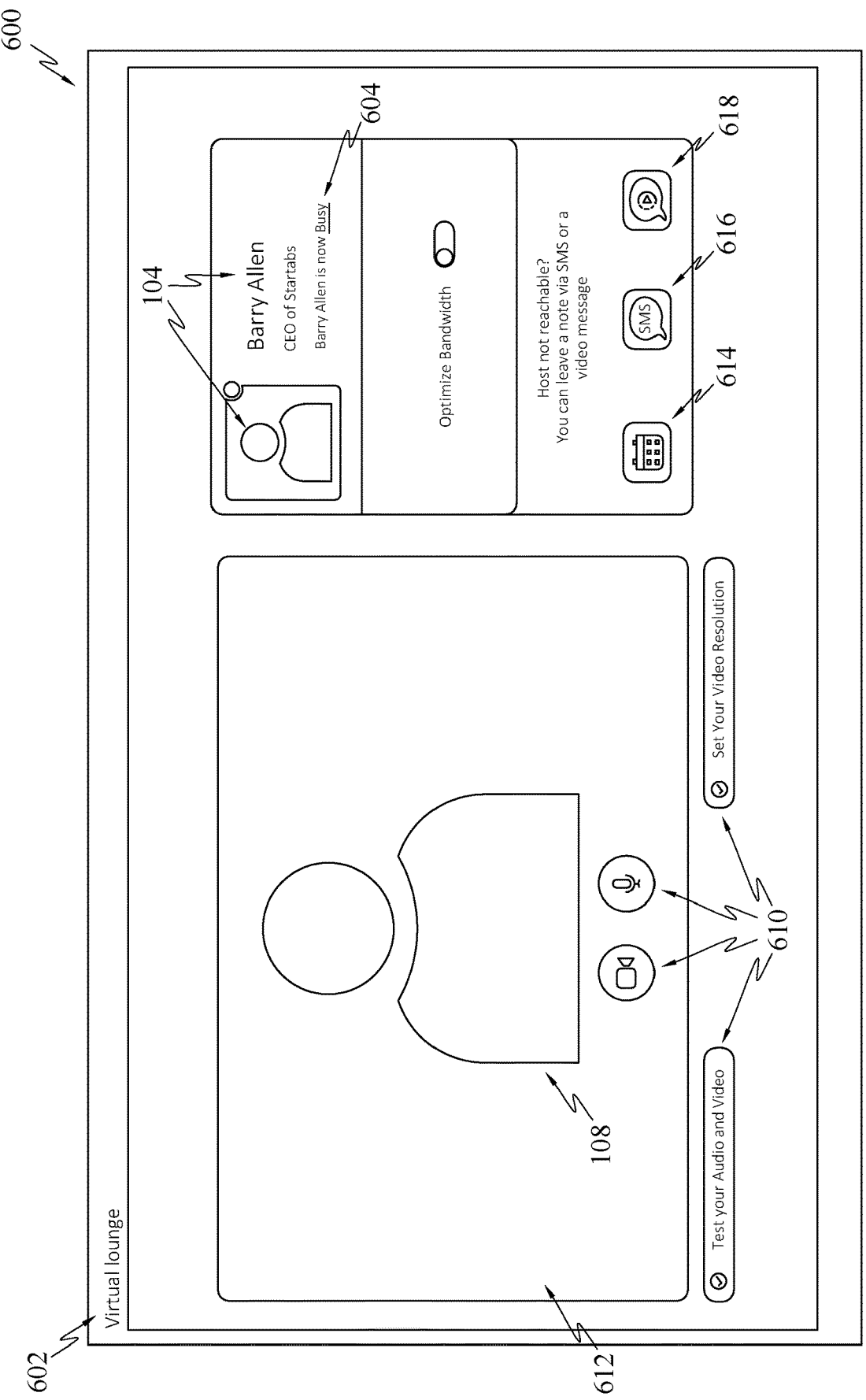
Figure 7:
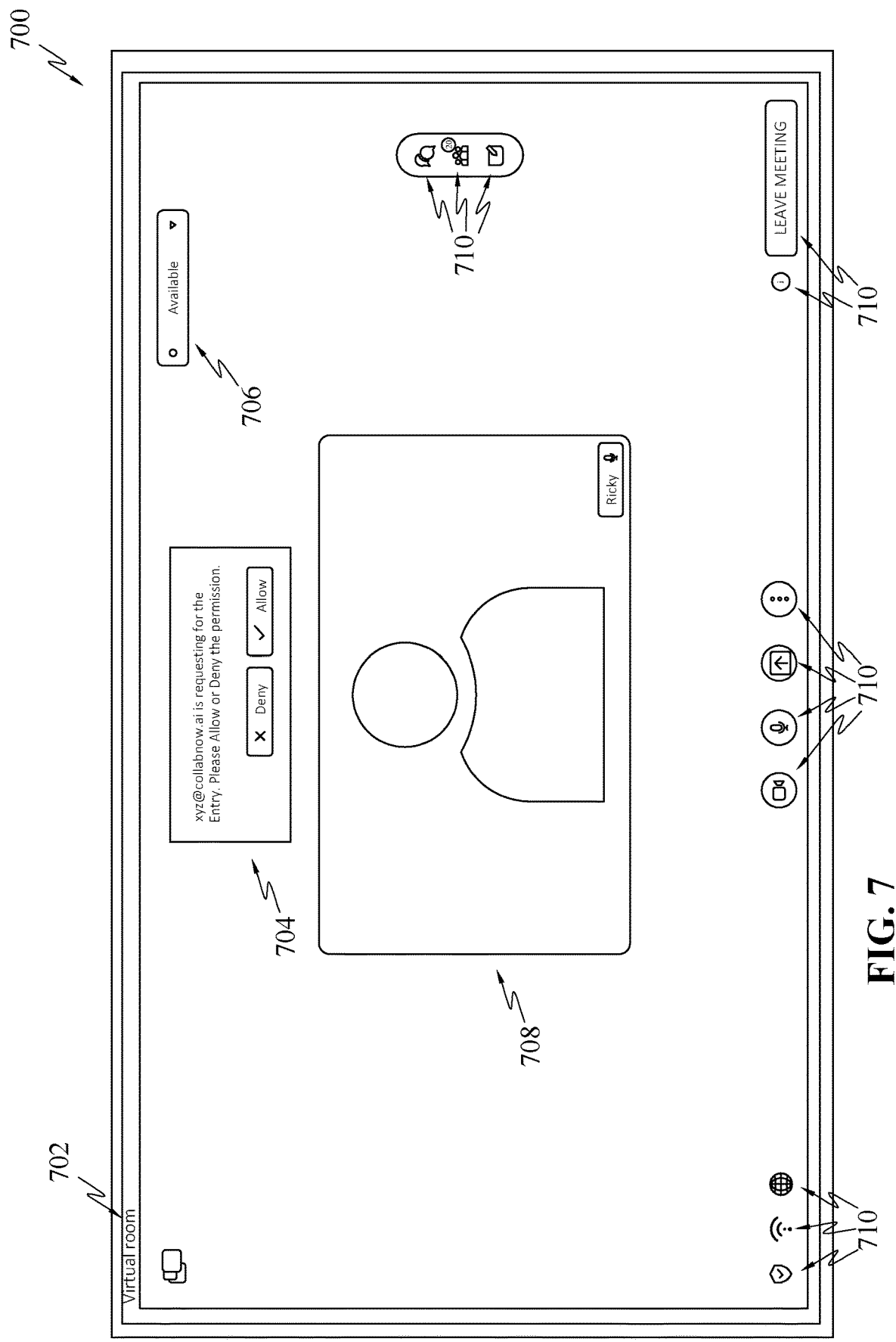
FIG. 7 illustrates a user interface 700 displayed to the first user 104 on the first data processing system 102, in accordance with an embodiment.

Referring to FIGS. 6A, 6B and 7, once the second user 108 enters the virtual lounge 602, an avatar of the second user 108 may be displayed in a window 612. The avatar displayed may enable the second user 108 to manage the video that may be displayed to the first user 104 upon entering the virtual room 702.

In an embodiment, keys 610 may be displayed to enable the second user 108 to adjust audio and video parameters before entering the virtual room 702 of the first user 104.

In an embodiment, the second digital client 314 may be configured to display an indicator 604 indicating the availability of the first user 104. The indicator 604 may present the availability status from among a group of statuses comprising Busy, Away, Available, Offline, and Do Not Disturb, wherein status of the first user 104 may be retrieved by the server 110 from the first data processing system 102.

In an embodiment, the indicator 604 may indicate as "Busy", when the first user 104 rejects a request of the second user 108 to access the virtual room 702 or the first user 104 is engaged in an online meeting with a third user in the virtual room 702.

In an embodiment, the indicator 604 may be configured to indicate as "Away" when the first user 104 is not in the virtual room 702. The server 110 may be configured to allow the second user 108 to schedule the online meeting with the first user 104, when the status of the first user 104 is indicated as "Away".

In an embodiment, the second digital client 314 may be configured to display an indicator 606 indicating the availability of the virtual room 702.

In an embodiment, the server 110 may be configured to provide the first user 104 with a list of options to select an appropriate status of the virtual room 702.

In an embodiment, a plurality of clickable buttons (610, 710) may be provided that enable users to provide inputs such as disconnect the video call, mute the microphone, share screen, leave meeting, internet connection status and so on.

In an embodiment, a clickable icon 608 may be displayed, wherein the icon 608 enables the second user 108 to request entry to the virtual room 702 associated with the first user 104.

In another embodiment, the server 110 may be configured to provide an option to the second user 108 to request entry into the virtual room 702 from the virtual lounge 602 associated with the first user 104. Once the second user 108 selects the "Request entry" icon 608, the server 110 may be configured to display the first pop-up window 704 to notify the first user 104 that the second user 108 is requesting to enter the virtual room 702 while the first user 104 is present in the virtual room 702, in accordance with an embodiment.

In case the first user 104 denies the request, the server 110 may be configured to change the indicator 604 to "Busy" and display the "Schedule a meeting" icon 614, the "SMS" icon 616, and a "Video" icon 618, providing the second user 108 multiple options to select from.

In another embodiment, in case the first user 104 denies the request, the server 110 may be configured to change the indicator 604 to "Busy" and change the "Request entry" icon 608 to "Schedule a meeting" icon 614. An "SMS" icon 616 and a "Video" icon 618 may also be displayed below the "Schedule a meeting" icon 614 providing the second user 108 multiple options to select from. Upon clicking the "Schedule a meeting" icon 614, the second user 108 may be allowed to schedule an online meeting with the first user 104 in future.

In an embodiment, the server 110 may comprise of a calendar, wherein the server 110 may be configured to retrieve availability of the first user 104 and the second user 108 for scheduling the online meeting.

In an embodiment, upon clicking the "Schedule a meeting" icon 614, the server 110 may be configured to display the calendar to the second user 108.

In an embodiment, the server 110 may be configured to display the availability of the first user 104 and the second user 108, to the second user 108 for scheduling the online meeting.

In an embodiment, the calendar may be configured to display time and date, wherein the calendar may be further configured to record tasks performed and tasks to be performed by the first user 104.

In an embodiment, the calendar may be configured to record tasks performed and tasks to be performed by the second user 108.

In an embodiment, the calendar may be configured to record tasks performed and tasks to be performed by the first user 104, the second user 108, the third user, and so on.

In an embodiment, tasks may comprise of online meetings scheduled among the first user 104, the second user 108, the third user, and so on.

In an embodiment, the calendar may be a pop-up window that is displayed to the second user 108 on the second data processing system 106.

In an embodiment, the server 110 may be configured to redirect the second user 108 to a webpage comprising of a calendar via means of a Uniform Resource Locator (URL)

in cases where a third party calendar may be employed by one or more users for tracking tasks.

In an embodiment, the server 110 may allow the second user 108 to select an available time slot within the calendar for scheduling the online meeting with the first user 104.

In an embodiment, once the second user 108 successfully schedules the online meeting, the server 110 may be configured to notify the first user 104 about the scheduled meeting.

In an embodiment, the server 110 may be configured to notify the first user 104 of the scheduled online meeting by means of, but not limited to, an e-mail, a text message, and a phone call.

In embodiment, the server 110 may be configured to allow the second user 108 to choose a preferred manner to notify the first user 104. As an example, the second user 108 may choose to request the server 110 to notify the first user 108, only by a phone call, a text message or an e-mail.

In an embodiment, the server 110 may be configured to allow the first user 104 to re-schedule the online meeting scheduled by the second user 108, and further notify the second user 108 of the re-scheduled meeting.

In an embodiment, the server 110 may be configured to notify the second user 108 of the re-scheduled online meeting via an Email, text message or call.

In an embodiment, an "SMS" icon 616 and a "Video" icon 618 may be displayed. The "SMS" icon 616 may enable the second user 108 to send a note (may also be referred to as 'message') to the first user 104 in the form of a text message. The "Video" icon 618 may enable the second user 108 to send a note to the first user 104 in the form of a video message.

In an embodiment, the "Video" icon 618 may be replaced with an "Audio" icon, wherein the second user 108 may be allowed to send an audio message to the first user 104 upon clicking the icon.

In another embodiment, when the first user 104 denies the entry request, the server 110 may be configured to change the indicator 604 to "Busy" and change "Request entry" icon 608 to "Send a message" icon, wherein upon clicking the "Send a message" icon, the second user 108 may be allowed to send a message to the first user 104.

In an embodiment, the message may comprise of an audio stream and a video stream, a text message, a voice note (audio stream) and a captured screen video recording of display interface associated with a second data processing system 106, among others.

In an embodiment, the server 110 may be configured to notify the first user 104 of the message created by the second user 108 and sent to the first user 104.

In an embodiment, the server 110 may be configured to notify the first user 104 via means of, but not limited to, an e-mail, a text message, or a phone call of the message.

Figure 8:
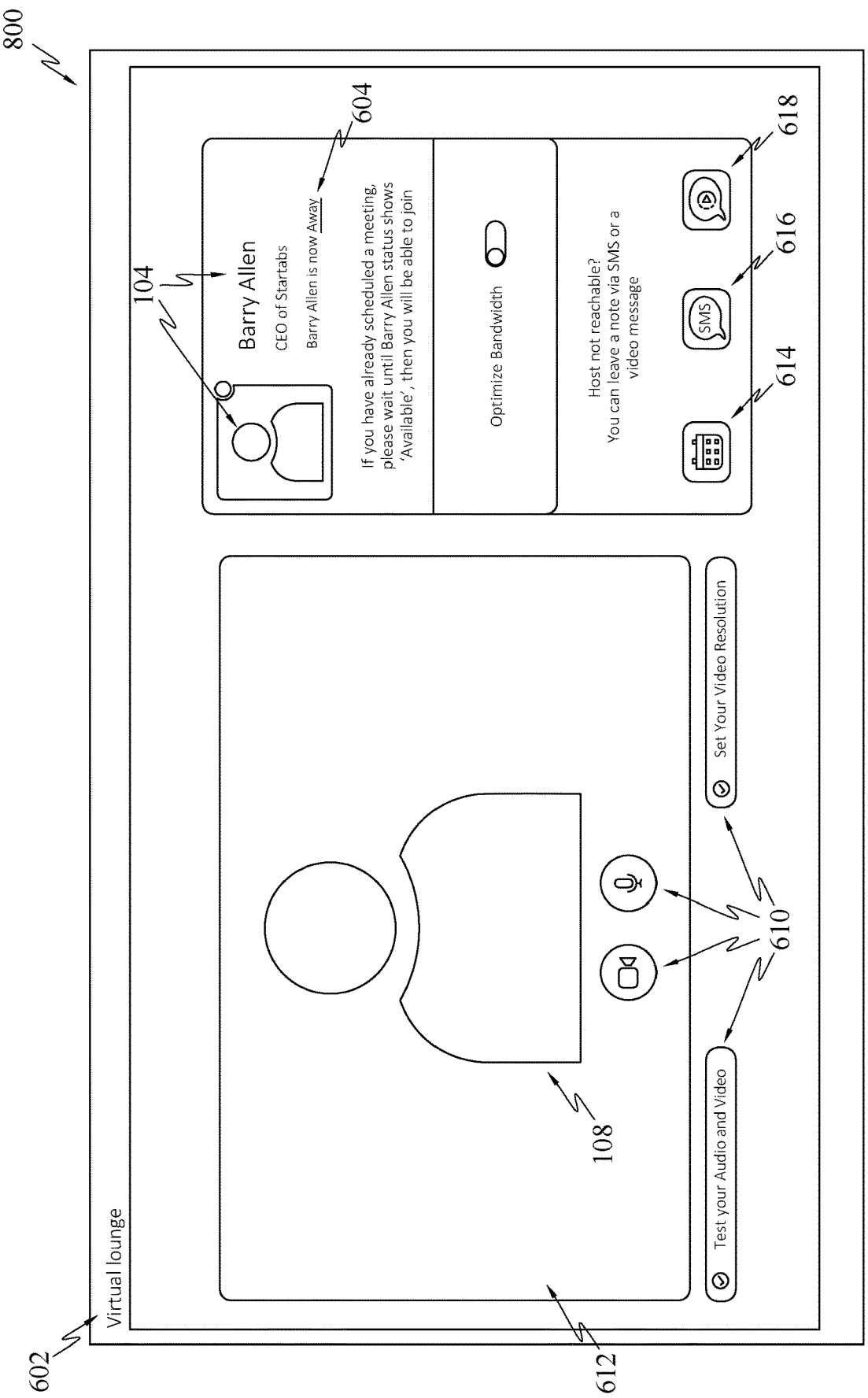
FIG. 8 illustrates a user interface 800 displayed to the second user 108 on the second data processing system 106, in accordance with an embodiment.

Referring to FIG. 8, according to an embodiment, when the indicator 604 indicates as "Away", the server 110 may be configured to allow the second user 108 to schedule the online meeting with the first user 104. Further, the server 110 may be configured to suggest the second user 108 to wait for the first user 104 to become available, if the second user 108 has already scheduled a meeting with the first user 104.

Figure 9:
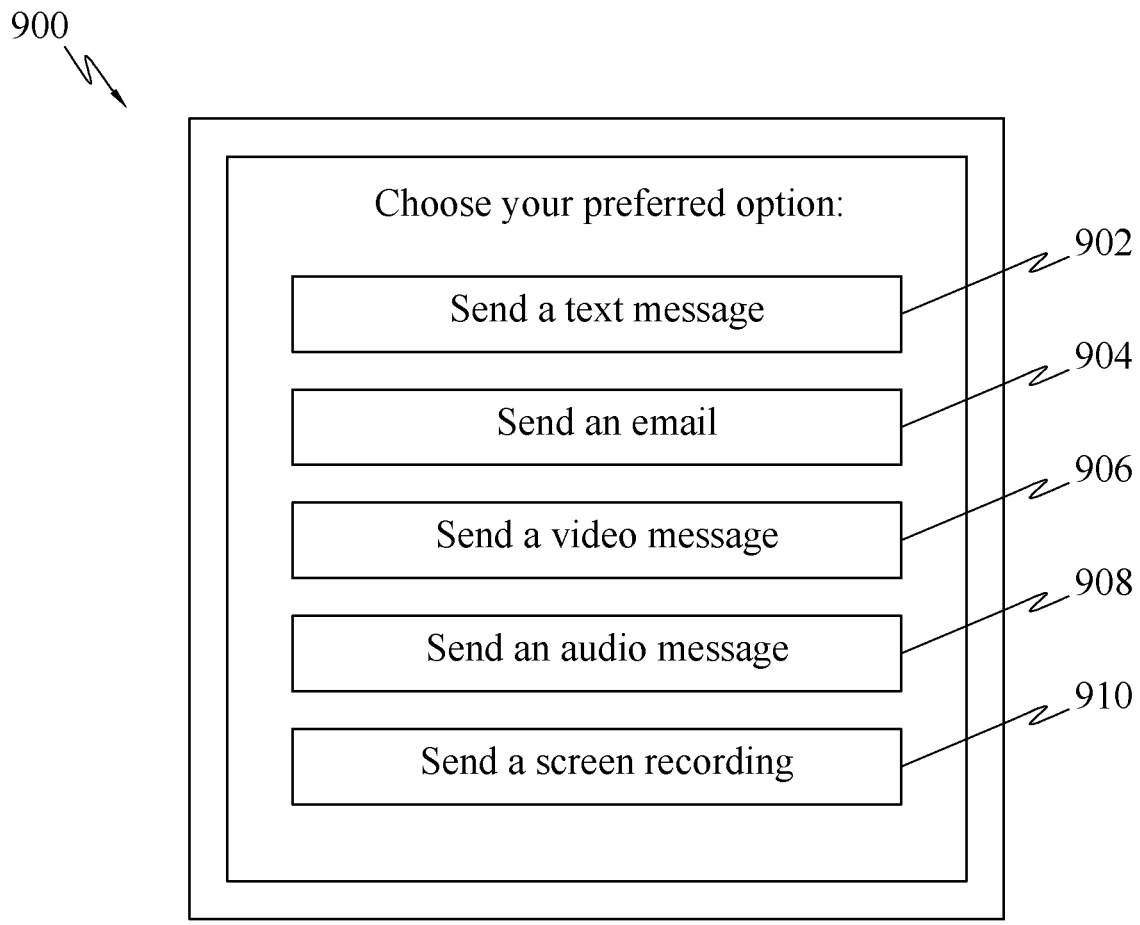
FIG. 9 illustrates a second pop-up window 900 displayed to the second user 108 on the second data processing system 106, in accordance with an embodiment.

According to another embodiment, FIG. 9 illustrates a second pop-up window 900 that may be displayed to the second user 108 when the second user 108 clicks on the "Send a message" icon. The second pop-up window 900 may be displayed to the second user 108 on the second display module 306 of the second data processing system 106 to enable the second user 108 to select type of message to be sent to the first user 104 and send the message to the first user 104 in a preferred manner.

In an embodiment, the "SMS" icon 616 and the "Video" icon 618 may be replaced with any other icon which when clicked may display the second pop-up window 900.

In an embodiment, the second pop-up window 900 may comprise of icons such as, but not limited to, "Send a Text Message" 902, "Send an Email" 904, "Send a Video Message" 906, "Send an Audio Message" 908, and "Send a screen recording" 910.

In an alternate embodiment, the server 110 may be configured to combine one or more icons to enable the second user 108 to send a message in a preferred manner. As an example, the second pop-up window 900 may comprise of icons such as, but not limited to, "Send a Text Message and an Email", "Send an Email and an Audio Message", "Send a Video Message and a Screen Recording", "Send an Audio Message and a Screen Recording", and "Send a Screen Recording along with an Audio and Video Message".

In an alternate embodiment, the server 110 may be configured to allow the second user 108 to choose plurality of options provided in the second pop-up window 900 to enable the second user 108 to send the message in a preferred manner.

In an embodiment, the server 110 may be configured to display the "Schedule a meeting" icon 614 when the second user 108 enters the virtual lounge 602.

In an embodiment, the server 110 may be configured to display the "Send a message" icon when the second user 108 enters the virtual lounge 602.

In an embodiment, the server 110 may be configured to display the "Schedule a meeting" icon 614 along with the "Request entry" icon 608 when the second user 108 enters the virtual lounge 602.

In an embodiment, the server 110 may be configured to display the "Send a message" icon along with the "Request entry" icon 608 when the second user 108 enters the virtual lounge 602.

Figure 10A:
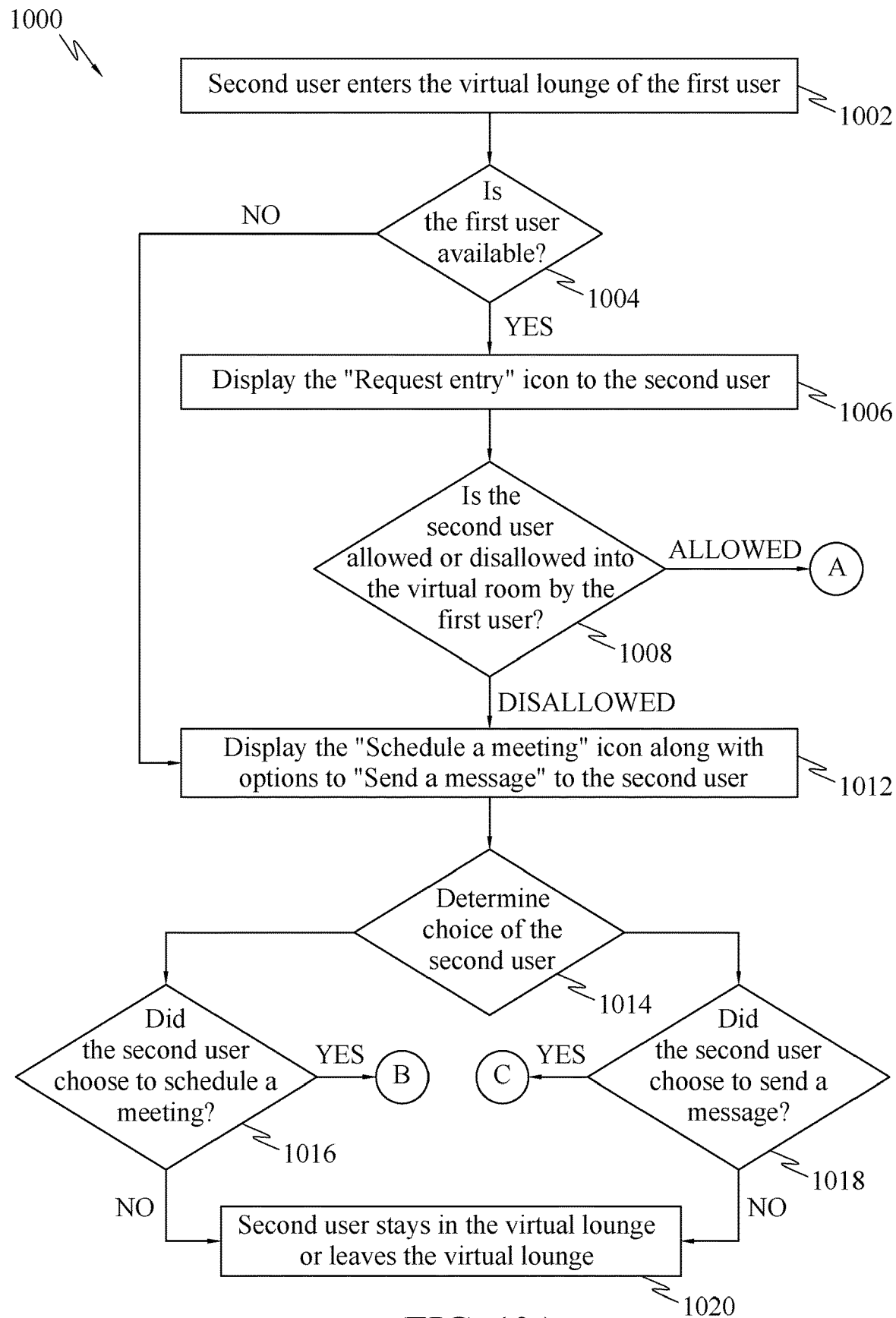
FIGS. 10A and 10B illustrate a flowchart 1000 for allowing the second user 108 to schedule a meeting with the first user 104, in accordance with an embodiment.
Figure 10B:
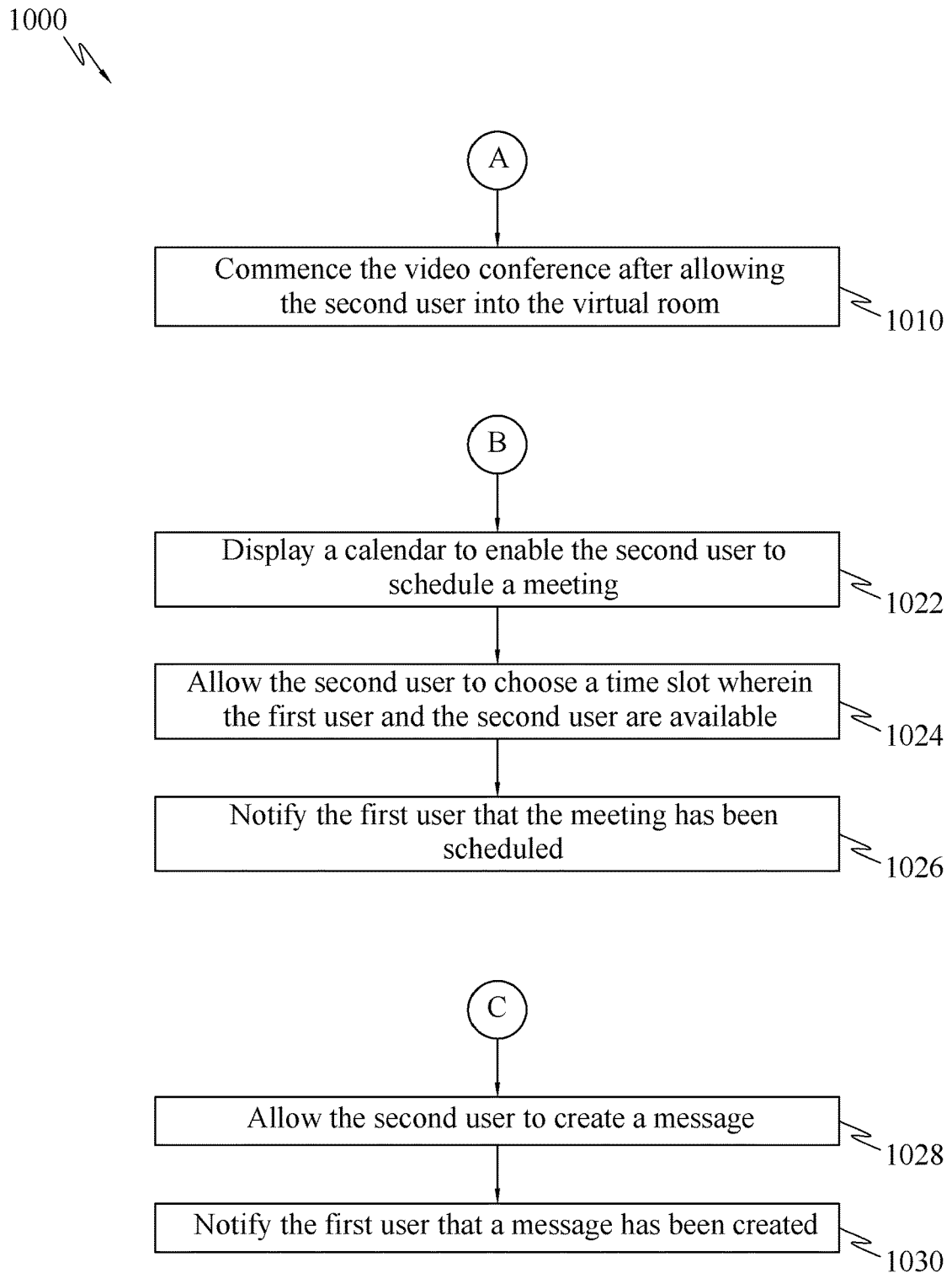

FIGS. 10A and 10B illustrate a flowchart 1000 for allowing the second user 108 to schedule a meeting with the first user 104, in accordance with an embodiment. At step 1002, the second user 108 may enter the virtual lounge 602 associated with the virtual room 702 which is uniquely associated with the first user 104.

At step 1004, the server 110 may be configured to check if the status of the first user 104 is available or otherwise.

In an embodiment, if the first user is unavailable, the server 110 may be configured to display "Schedule a meeting" icon 614 along with options to send a message (leave a note) to the second user 108, refer to step 1012.

In an embodiment, the server 110 may enable the second user 108 to send a text message, a video message, or an audio message as a note to the first user 104.

At step 1006, the server 110 may be configured to display a "Request entry" icon 608 if the first user 104 is present in the virtual room 702.

In an embodiment, the server 110 may be configured to display an indicator 604 as available when the first user 104 is present in the virtual room 702.

In an embodiment, the server 110 may be configured to display indicator 604 as available, and indicator 606 as busy when the first user 104 has chosen an indicator 706 as available while having a third user inside the virtual room 702.

At step 1008, upon requesting entry into the virtual room 702 by clicking the "Request entry" icon 608 by the second user 108, the server 110 may be configured to check if the second user 108 is allowed or disallowed into the virtual room 702 by the first user 104.

At step 1010, if the second user 108 is allowed by the first user 104 into the virtual room 702, the server 110 may be configured to establish a video call between the second user 108 and the first user 104 in the virtual room 702.

At step 1012, if the second user 108 is disallowed into the virtual room 702 by the first user 104, the server 110 may be configured to display the "Schedule a meeting" icon 614 along with options to send a message to the second user 108 present in the virtual lounge 602 by providing "SMS" icon 616 and "Video" icon 618.

At step 1016, the server 110 may be configured to check whether the second user 108 intends to schedule a meeting in future with the first user 104.

At step 1018, the server 110 may be configured to check whether the second user 108 intends to send a message to the first user 104.

At step 1020, the second user 108 may decide to wait for the first user 104 to become available in the virtual lounge 602 or may leave the virtual lounge 602 by clicking one of the icons from the plurality of icons 610.

At step 1022, if the second user 108 chose to schedule a meeting with the first user 104 by clicking the "Schedule a meeting" icon 614, the server 110 may be configured to display a calendar to the second user 108, wherein the calendar may show available dates and time of the first user 104 and the second user 108 for an online meeting.

At step 1024, the server 110 may be configured to receive confirmation from the second user 108 regarding the date and time for the online meeting.

At step 1026, the server 110 may be configured to notify the first user 104 that the online meeting has been scheduled by the second user 108.

At step 1028, is the second user 108 chose to send a message to the first user 104 by clicking the "SMS" icon 616 or the "Video" icon 618, the server 110 may be configured to allow the second user 108 to create a message in a manner preferred by the second user 108.

At step 1030, the server 110 may be configured to notify the first user 104 that a message has been left by the second user 108 for the first user 104.

Figure 11:
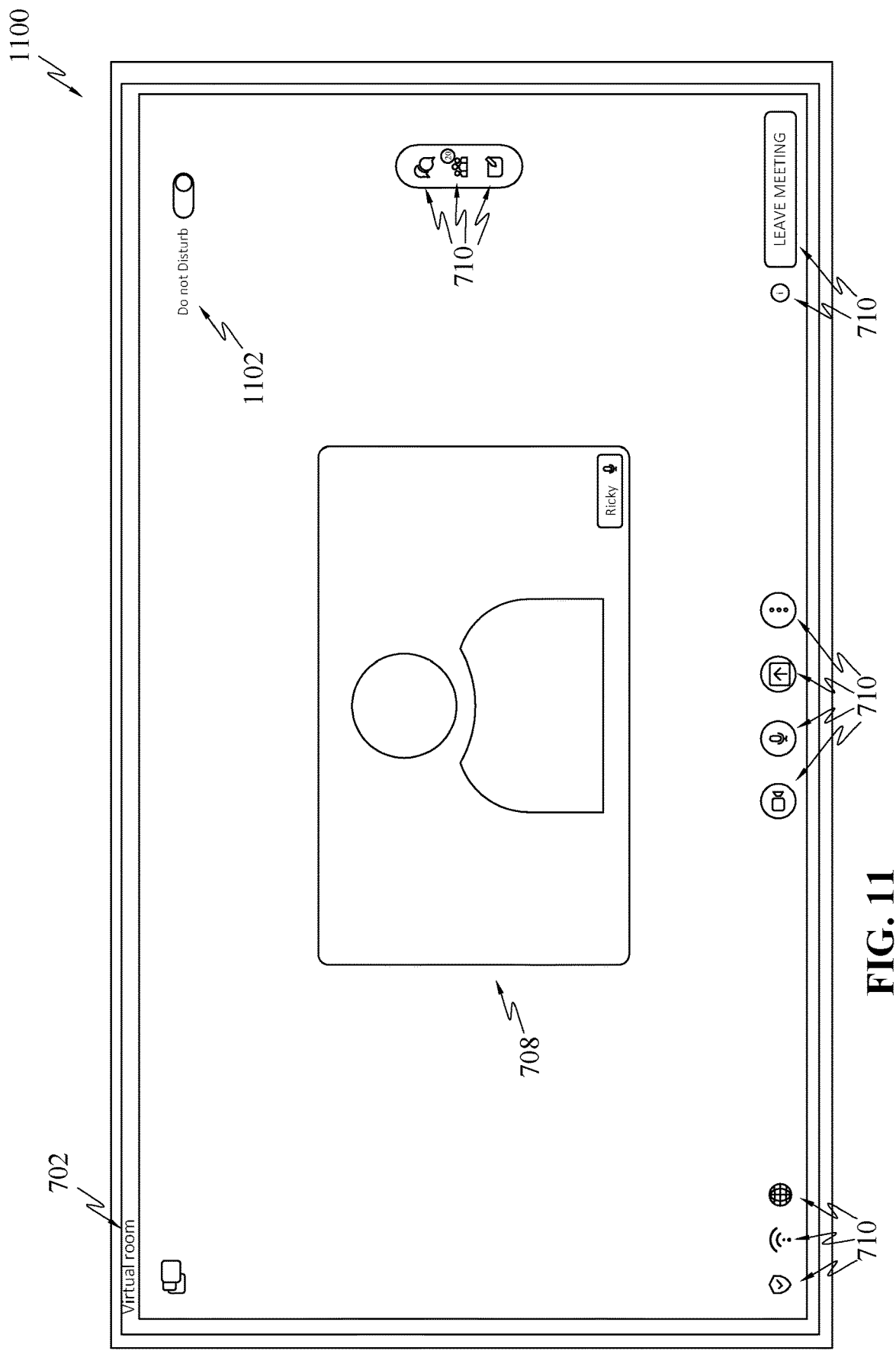
FIG. 11 illustrates a user interface 1100 displayed to the first user 104 on the first data processing system 102, in accordance with an embodiment.
Figure 12:
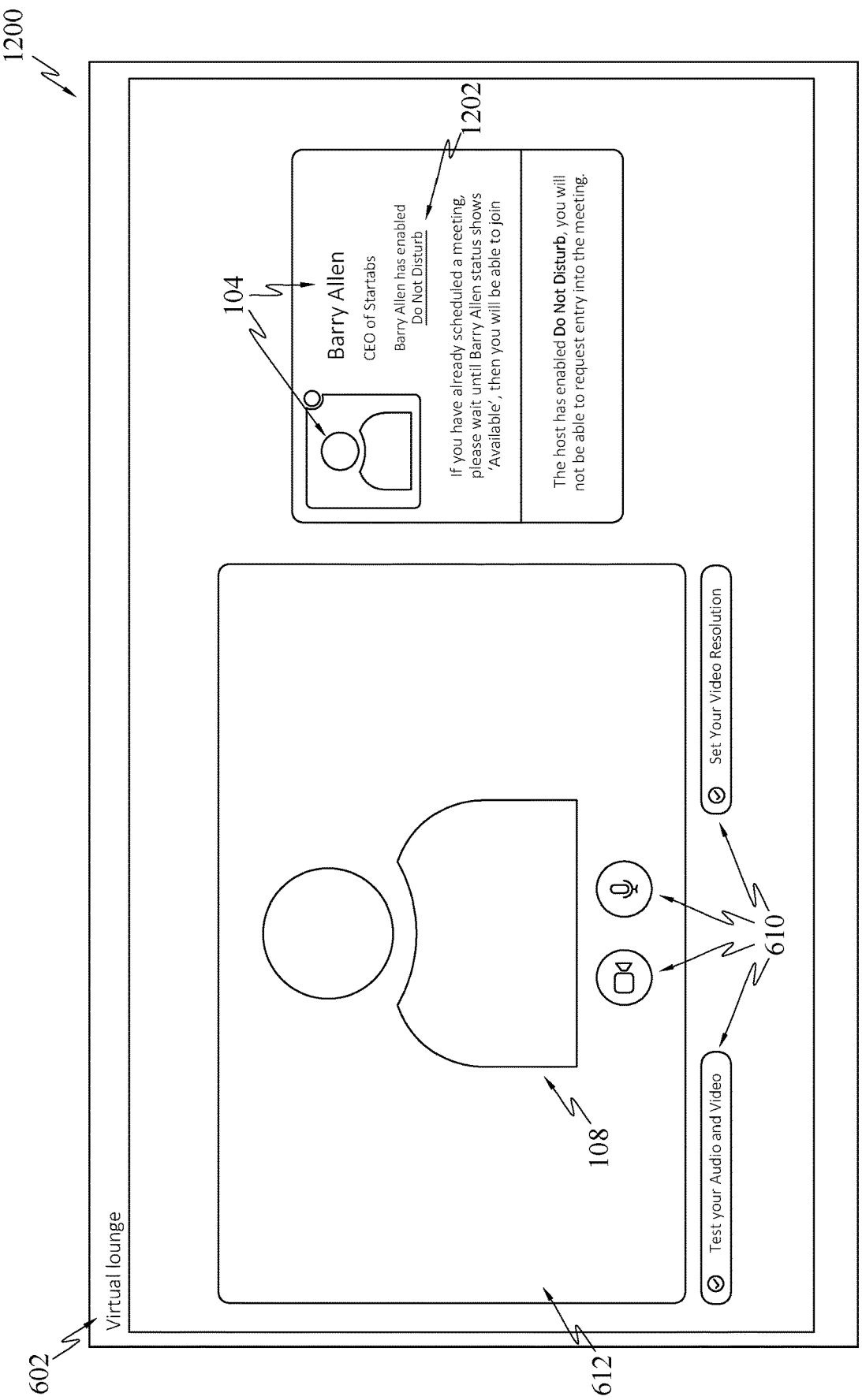
FIG. 12 illustrates a user interface 1200 displayed to the second user 108 on the second data processing system 106, in accordance with an embodiment.

Referring to FIGS. 11 and 12, according to another embodiment, the first user 104 may choose to turn "ON" the "Do not disturb" option displayed by sliding an indicator 1102, when the first user 104 is in the virtual room 702.

In an embodiment, the server 110 may be configured to display the status of the first user 104 via an indicator 1202 to the second user 108 upon entering the virtual lounge 602.

In an embodiment, when the indicator 1202 indicates as "Do not disturb", the server 110 may be configured to not display the "Request entry" icon 608 to the second user 108 upon entering the virtual lounge 602.

In an embodiment, when the indicator 1202 indicates as "Do not disturb", the server 110 may be configured to not display the "Schedule a meeting" icon 614, the "SMS" icon 616, and a "Video" icon 618 to the second user 108 upon entering the virtual lounge 602. Further, the server 110 may be configured to suggest the second user 108 to wait for the first user 104 to become available, if the second user 108 has already scheduled a meeting with the first user 104.

In another embodiment, when the indicator 1202 indicates as "Do not disturb", the server 110 may be configured to display the "Schedule a meeting" icon 614, the "SMS" icon 616, and the "Video" icon 618. The server 110 may be further configured to notify the first user 104 once the indicator 1102 is turned "OFF" by the first user 104.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and process or method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for notifying a first user regarding an activity of a second user, the system comprising:
a first data processing system associated with a first user;
a second data processing system associated with a second user; and
a server comprising at least one processor configured to:
create a virtual room, and a virtual lounge associated with the virtual room, wherein the virtual room is uniquely associated with the first user;
establish a secured connection between the first data processing system and the second data processing system;
provide the second user, access to the virtual lounge of the virtual room upon establishing the secured connection between the first data processing system and the second data processing system; and
notify status of the first user to the second user when the second user is in the virtual lounge, wherein when the status of the first user is other than available, the server is configured to:
allow the second user to schedule an online meeting with the first user;
communicate availability of the first user to the second user for scheduling the online meeting; and
notify the first user of the scheduled online meeting.

2. The system according to claim 1, wherein the server comprises a calendar, wherein the server is configured to:
retrieve availability of the first user and the second user for the online meeting; and
display the availability of the first user and the second user for the online meeting.

3. The system according to claim 2, wherein the server allows the second user to select an available time slot within the calendar for scheduling the online meeting with the first user.

4. The system according to claim 1, wherein the second data processing system is configured to display an indicator associated with the first user, wherein the indicator represents the status of the first user when the second user enters the virtual lounge.

5. The system according to claim 4, wherein the status of the first user comprises Available, Away, Busy, Do Not Disturb and Offline, wherein the status is represented by the indicator.

6. The system according to claim 5, wherein the indicator is configured to indicate Busy, when:
the first user rejects a request of the second user to access the virtual room; or
the first user is engaged in an online meeting with a third user in the virtual room.

7. The system according to claim 1, wherein the server is configured to notify the first user of the online meeting scheduled by the second user via an Email, text message or call.

8. The system according to claim 2, wherein the server is configured to:
allow the first user to re-schedule the online meeting scheduled by the second user; and
notify the second user of the re-scheduled meeting.

9. The system according to claim 8, wherein the server is configured to notify the second user of the re-scheduled online meeting via an Email, text message or call.

10. A system for notifying a first user regarding an activity of a second user, the system comprising:
a first data processing system associated with a first user;
a second data processing system associated with a second user; and
a server comprising at least one processor configured to:
create a virtual room, and a virtual lounge associated with the virtual room, wherein the virtual room is uniquely associated with the first user;
establish a secured connection between the first data processing system and the second data processing system;
provide the second user, access to the virtual lounge of the virtual room upon establishing the secured connection between the first data processing system and the second data processing system; and
notify status of the first user to the second user when the second user is in the virtual lounge, wherein when the status of the first user is other than available, the server is configured to:
allow the second user to create a message; and
notify the first user of the message.

11. The system according to claim 10, wherein the second data processing system is configured to display an indicator associated with the first user, wherein the indicator represents the status of the first user when the second user enters the virtual lounge.

12. The system according to claim 10, wherein the status of the first user comprises Available, Away, Busy, Do Not Disturb and Offline, wherein the status is represented by the indicator.

13. The system according to claim 12, wherein the indicator is configured to indicate Busy, when:
the first user rejects a request of the second user to access the virtual room; or
the first user is engaged in an online meeting with a third user in the virtual room.

14. The system according to claim 10, wherein the server is configured to notify the first user of the message created by the second user via an Email, text message or call.

15. The system according to claim 10, wherein the server is configured to allow the first user to respond to the message created by the second user.

16. The system according to claim 10, wherein the message comprises an audio stream and a video stream.

17. The system according to claim 10, wherein the message is a text message.

18. The system according to claim 10, wherein the message comprises an audio stream.

19. The system according to claim 10, wherein the message comprises a captured screen video recording of a display interface associated with a second data processing system.

* * * * *